United States Patent [19]

Langenstein

[11] Patent Number: 4,930,933
[45] Date of Patent: Jun. 5, 1990

[54] HAND TOOL, ESPECIALLY A GARDENING, FARM, CLEANING, OR LIKE IMPLEMENT

[75] Inventor: Max Langenstein, Dietenheim, Fed. Rep. of Germany

[73] Assignee: Max Langenstein Feld- und Gartengerate GmbH & Co., Illertissen, Fed. Rep. of Germany

[21] Appl. No.: 213,580

[22] Filed: Jun. 30, 1988

[30] Foreign Application Priority Data

Jul. 4, 1987 [DE] Fed. Rep. of Germany ....... 3722219

[51] Int. Cl.⁵ .......................... B25G 3/18; F16B 2/02; F16D 1/06
[52] U.S. Cl. .................................. 403/330; 172/371; 403/361; 403/374; 403/316
[58] Field of Search ............... 403/330, 361, 373, 263, 403/316, 374, 109; 172/371, 376

[56] References Cited

U.S. PATENT DOCUMENTS

| 1,634,422 | 7/1927 | Holmes | 403/373 |
| 4,029,279 | 6/1977 | Nakatani | 403/109 |
| 4,596,484 | 6/1986 | Nakatani | 403/374 |
| 4,761,092 | 8/1988 | Nakatani | 403/328 |

FOREIGN PATENT DOCUMENTS 1580007 11/1980 United Kingdom ................ 403/330

Primary Examiner—Randolph A. Reese
Assistant Examiner—Carol I. Bordas
Attorney, Agent, or Firm—Herbert Dubno; Ronald Lianides

[57] ABSTRACT

An attaching socket of a working implement fits a tool shaft and has an exterior clamping device with a clamping piece, which with the clamping device in a closed condition engages in the tool shaft through an opening in a wall of the attaching socket. The clamping piece is mounted on a clamping lever which is mounted pivotable exteriorly on the attaching socket about a pivot axis extending substantially perpendicular to the sleeve axis and extends from that pivot axis substantially further than the length of the clamping piece. This clamping piece together with the clamping lever form a bent lever. The clamping lever is pivoted in against the tool shaft in the closed condition of the clamping device, while it is swung out in the open condition far enough from it so that the clamping piece is out of engagement with the tool shaft. With the clamping device closed the end of the tool shaft is braced by the clamping piece axially against a backstop formed by and in the attaching socket.

27 Claims, 7 Drawing Sheets

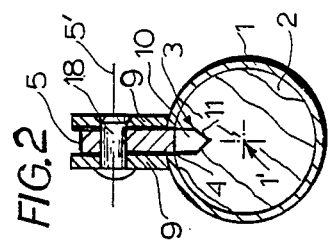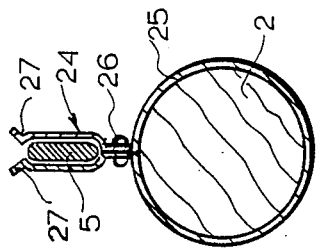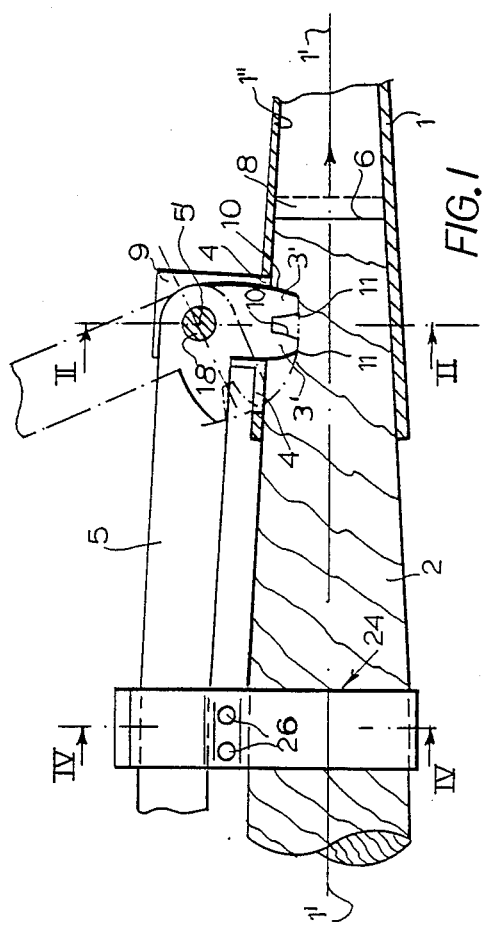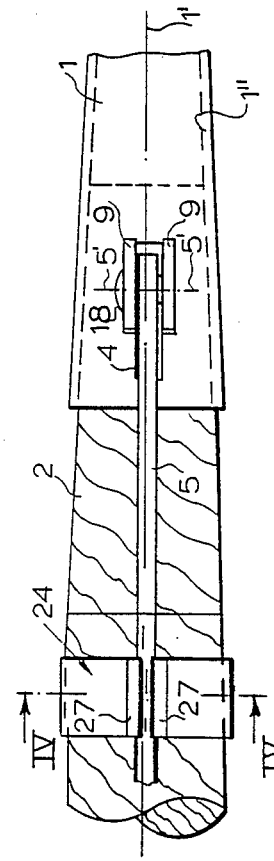

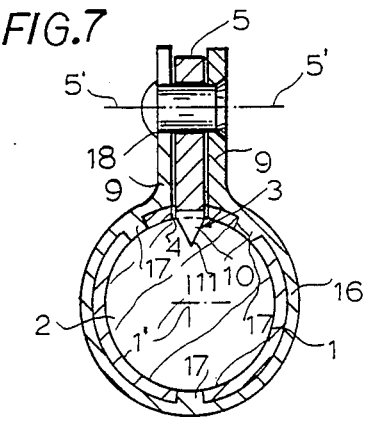
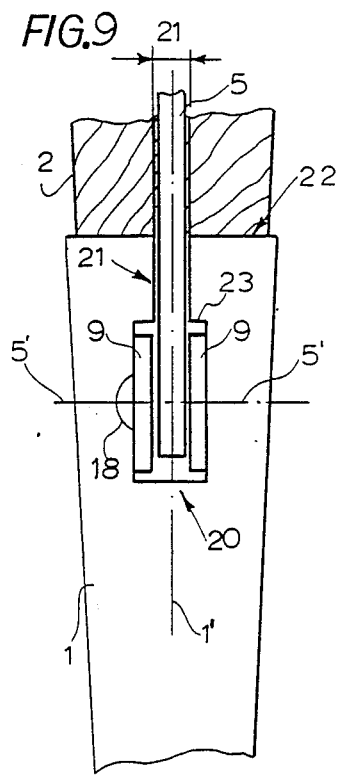
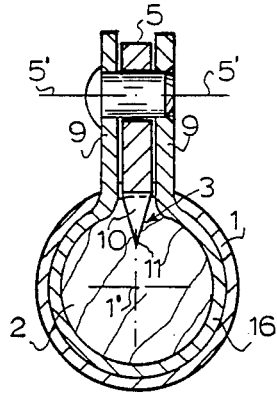

HAND TOOL, ESPECIALLY A GARDENING, FARM, CLEANING, OR LIKE IMPLEMENT

FIELD OF THE INVENTION

My present invention relates to a hand tool, especially a gardening, farm, field or cleaning implement. More particularly, the invention relates to an attachment assembly for connecting the working part of the implement to a handle.

BACKGROUND OF THE INVENTION

A hand tool, especially a gardening tool, a farm tool, a scraping or raking tool, cleaning tool, or the like, can comprise a tool shaft received in an attaching socket of a working implement and a clamping device mounted exteriorly on the attaching socket with a clamping piece which engages the tool shaft as is described in German Utility Model DE-GM 83 18 026.

Here the attaching socket is slotted axially over its entire length which carries a clamping coupling surrounding it exteriorly which is provided with a clamping screw pressing together the attaching socket radially.

The clamping screw is guided substantially radially in a threaded hole or nut in the clamping coupling and has a lateral plate or point on its front end forming the clamping piece which is simultaneously forced with the pressing force of the attaching socket into the wood of the tool shaft. This type of shaft attachment has proven satisfactory, but it is usable only when longitudinal slots are present in the attaching socket.

OBJECTS OF THE INVENTION

It is an object of my invention to provide an improved hand tool, especially an improved garden, farm, cleaning, scraping, raking or like implement, which is free from the disadvantages and drawbacks of earlier shaft attachment systems.

It is another object of my invention to provide an improved hand tool or implement which has its working part strongly attached to the tool shaft even in the case of unslotted attaching sockets.

It is also an object of my invention to provide an improved hand tool whose working implement can be easily and quickly released from or attached to the tool shaft so that a rapid and simple tool replacement can be made.

SUMMARY OF THE INVENTION

These objects and others which will become more readily apparent hereinafter are attained in accordance with my invention in a hand tool, especially a gardening, a farm, a scraping or raking, cleaning tool, or the like, comprising a tool shaft received in an attaching socket of a working implement and a clamping device mounted exteriorly on the attaching socket with a clamping piece which engages the tool shaft through an opening in the wall of the attaching socket with the clamping device in the closed condition.

According to my invention the clamping piece is formed on a clamping lever which is pivotally mounted exteriorly on the attaching socket so as to be pivotable about a pivot axis extending substantially perpendicularly to the longitudinal axis of the socket and the clamping lever is substantially longer than the clamping piece from the pivot axis and forms together with the clamping piece a bent (bell-crank) lever.

The clamping lever is swung in against the tool shaft into the closed condition of the clamping device and is swung away from the shaft into the open condition, sufficiently far from the tool shaft that the clamping piece is withdrawn out of engagement with the tool shaft and on closing the clamping device the end of the tool shaft is braced by the clamping piece axially against a stop formed by the attaching socket.

Thus the clamping lever forces the clamping piece to simultaneously engage the tool shaft and pushes it axially forward against the stop so that, with the clamping device closed, the tool shaft is clamped reliably between the stop and the clamping piece and is held reliably in the attaching socket even when the attaching socket is not longitudinally slotted.

Advantageously the attaching socket has two trunnion lugs protruding substantially radially from the attaching socket and positioned substantially parallel to one another in spaced relationship, and between which the opening is provided in the wall of the attaching socket.

In a very simple and highly advantageous embodiment of my invention, the clamping piece is pointed to a toothlike portion engaged in the tool shaft and has a knife-edge-like tooth front facing the shaft end. Hence, the clamping piece can be forced in the tool shaft easily, especially when the tool shaft is made of wood. This guarantees a reliable axial engagement with the tool shaft by its tooth front when the clamping lever and with it the clamping piece are swung into the closed position.

It is also possible to provide grooves or depressions in the tool shaft in which the clamping piece engages on closing the clamping device.

In a particularly desirable embodiment of my invention, a groove is hollowed out of the tool handle or shaft for the portion of the clamping piece engaged in it and receives the clamping piece in its swung in position on the tool shaft. The clamping piece comes into contact with a wall or flank of the hollow at least in the axial direction toward the shaft front end.

The groove can be formed substantially slotlike in shape, however it is better when it runs like a ring around the circumference of the tool shaft so that the tool shaft can be inserted in the attaching socket in any of a variety of different angular positions about its longitudinal axis.

It is also possible to provide a metal fitting on the end of the tool shaft with the groove in it. Particularly this fitting can encompass the end of the tool shaft and comprise a circumferentially closed jacket.

In particular the groove forms a stop for the axial front edge of the clamping piece on the axial front end of the shaft.

In a particularly advantageous embodiment of my invention, the clamping piece on its shaft side ends in a convex circular arc surface whose center point lies between the circular arc surface and the pivot axis of the clamping piece, and the groove forms a concave circular arc surface corresponding to this convex circular arc surface, over which the clamping piece slides in and away with its circular arc surface during pivoting of the clamping lever.

This arrangement provides the advantage of a reduced force per unit area acting on both circular arc surfaces with the result that the base of the groove in the metal fitting can be made of only thin, elastic sheet fitting the circular arc surface of the clamping piece.

In addition the circular arc surface of the clamping piece can be provided with a shape or cross section, such as grooves, teeth or the like, extending substantially parallel to the pivot axis increasing the friction in the groove during the pivoting motion. The greater friction on seating the clamping piece in the groove contributes to the reliability of the clamping device.

In another embodiment of my invention the clamping piece has a plurality of teeth which engage in opposing indentations provided in the tool shaft. The teeth and the opposing indentations are axially aligned so that the clamping piece locks or catches on the tool shaft axially on pivoting.

The opposing indentations can be provided in a fitting mounted rigidly on the end of the tool shaft so that, with tool shafts made of wood or soft synthetic material such as plastic excessive wear of the opposing indentations need not be feared.

The teeth and the opposing indentations can be comparatively coarse or large. It is possible to form the teeth by at least one stud and the opposing indentations as holes or perforations in the wall of the fitting in which the stud engages.

Generally the studs and stud receiving members in the axial direction of the tool shaft are aligned in several groups beside each other on the clamping piece and/or on the fittings to allow a larger displacement range for the tool shaft in the attaching socket.

Also the teeth and opposing indentations can be divided into several rows over the circumference of the tool shaft so that the tool shaft can be set up or inserted in a plurality of different angularly offset positions about its axis in the attaching socket and engaged with the clamping piece.

The attaching socket can be cylindrical so the front end of the tool shaft can be appropriately pushed against a backstop which is located inside the attaching socket. In contrast in the conically tapered attaching socket the backstop is usually provided by the contact of the tool shaft on the conically tapered socket wall so that a special stop need not be provided inside the attaching socket for that purpose.

Both trunnion lugs can be welded to the attaching socket, bent away or punched out from or formed in another way from the material of the socket.

In one particularly advantageous embodiment of my invention both trunnion lugs are formed on a supporting member, which is held axially unslidably on the wall of the attachment sleeve.

In particular the supporting member can be formed as a clip, whose ends form both trunnion lugs. Thus it is possible to arrange the clip exteriorly on the attaching socket with a plurality of substantially radially directed pins adjacent the trunnion lugs and in positions approximately opposing each other on it which engage in pin holes in the wall of the attaching socket, and both trunnion lugs are attached tension-proof with each other by a bolt supporting the clamping lever with the clamping piece.

By this attachment resistant to separation under tension the clip cannot be spread and the pins cannot be removed from the pin receiving members or holes of the attaching socket.

A simpler construction has the clip positioned inside in the attaching socket and the trunnion lugs engaging outside through a window forming the opening for the clamping piece in the wall of the attaching socket.

A slot runs axially between the window and an end edge of the attaching socket whose width is at least equal to the thickness of both trunnion lugs together and smaller than the window. As a result the window prevents axial sliding and a radial spreading of the clip when it is in position in the window.

In another very desirable embodiment of my invention both trunnion lugs applied from the outside in the attachment sleeve with upwardly directed claws under both sides of the opening provided for the clamping piece are engaged by the flanges formed by the walls of the attaching socket and the supporting member is secured against axial sliding in the attaching socket.

Further a lock mechanism can be arranged between the tool shaft and the clamping lever to hold the clamping lever in locking engagement in the pivot position corresponding to the closed condition of the clamping device swung toward the tool shaft so that the clamping device cannot open unintentionally.

Instead of the above lock mechanism advantageously a locking device holding the clamping lever in the pivot position corresponding to the closed condition of the clamping device pivoted toward the tool shaft can be provided with a locking member which must be released in a manner which is different from the previous embodiments, before the clamping lever can be moved into the pivoted position corresponding to the open condition of the clamping device.

Appropriately the locking device has a locking member movable relative to the clamping lever, which engages in a recess provided in the clamping lever with a lock bolt under the force of a lock spring in the direction of motion, when the clamping lever is located in the pivoted position corresponding to the closed condition of the clamping device.

In this assembly a receptacle can also be provided for the locking member on the clamping lever adjacent the recess, in which the lock bolt of the locking member engages under the force of the lock spring, when the clamping lever is in the pivoted position corresponding to the open condition of the clamping device. The receptacle is formed in contrast to the recess so that the clamping lever can be moved from the locked position into its pivoted position corresponding to the closed condition of the clamping device without previously releasing the locking member.

The locking member can be mounted so as to pivot about another pivot axis parallel to the pivot axis of the clamping lever and is pivotable by hand against the force of the lock spring with its lock bolt from the recess.

Advantageously the locking member is supported on the trunnion lugs and/or on the supporting member forming the trunnion lugs. To provide good mechanical loading conditions for the locking member, it has two lateral plates overlapping the clamping lever on both sides of the recess and the receptacle, with which the locking member is supported on its pivot axis and between which a transverse pin forming the lock bolt extends.

It is also possible to provide a cap on the attaching socket, covering the trunnion lugs with the supporting member forming it, which has a window for the clamping lever and the locking member which protrude through it.

The clamping device by definition includes all parts of my invention except the tool shaft and the portion of the tool implement other than the attaching socket which are engaged in holding and securing the tool implement on the tool shaft.

The locking device includes the locking member with its lock bolt, the recess and receptacle on the clamping lever, the lock spring, the cap and other parts required to lock the clamping lever in its closed locked position until a release is desired.

The lock mechanism can be formed by a clip attached to the tool shaft which receives the clamping lever.

BRIEF DESCRIPTION OF THE DRAWING

The above and other objects, features and advantages of my invention will become more readily apparent from the following description, reference being made to the accompanying highly diagrammatic drawing in which:

FIG. 1 is an axial cross sectional view of one embodiment of the hand tool according to my invention through the portion showing the shaft attachment;

FIG. 2 is a cross sectional view taken along the section lines II—II of FIG. 1;

FIG. 3 is a top plan view of the object according to FIGS. 1 and 2;

FIG. 4 is a cross sectional view taken along the section line IV—IV of FIGS. 1 and 3;

FIG. 7 is a cross sectional view through another embodiment of my invention similar to that of FIG. 6;

FIG. 8 is a cross sectional view of an additional embodiment of my invention corresponding to that of FIGS. 6 and 7;

FIG. 9 is a top plan view of the embodiment of FIG. 8;

SPECIFIC DESCRIPTION

Figure 5:
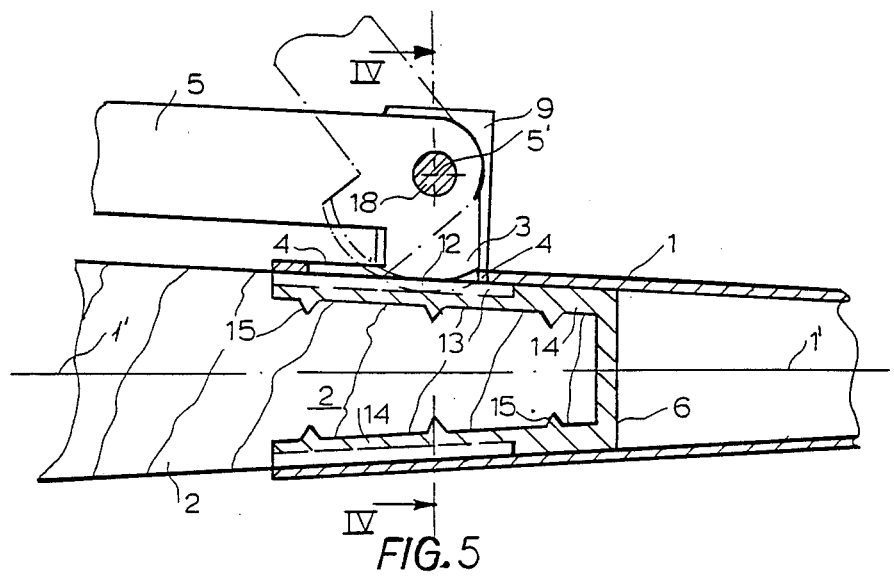
FIG. 5 is a longitudinal cross sectional view through another embodiment of the invention in a form corresponding to that of FIG. 1.

In the drawing the hand tool is shown only in part with a tool shaft 2 mounted in an attaching socket 1. At the front end of the attaching socket 1 the single working implement, which has not been shown in detail, is located, e.g. shovel blade, a rake, a hook, a hoe, a wiper or the like.

A clamping device is mounted exteriorly on the attaching socket 1 which has a clamping piece 3 which in the closed condition of the clamping device engages through an opening 4 in a wall of the attaching socket 1 in the tool shaft or handle 2.

The clamping piece 3 is attached to a clamping lever 5 which is mounted outside on the attaching socket 1 pivotable about a pivot axis 5' extending approximately perpendicularly to the socket axis 1'.

The clamping lever 5 extends from this pivot axis 5' substantially longer than the length of the clamping piece 3. The clamping lever 5 and the clamping piece 3 together form an elbow or bent (bell-crank) lever with lever arms which are substantially different in length.

In the closed state of the clamping device the clamping lever 5 is pivoted toward the tool shaft 2 as is shown in FIGS. 1 and 5. In the open condition of the clamping device however the clamping lever 5 is pivoted away so far from the tool shaft 2 according to the dot-dashed illustration in FIGS. 1 and 5 that the tool shaft 2 can be pulled out from the attaching socket and/or can be inserted into it.

If the clamping device is closed, the clamping piece 3 then forced into the tool shaft clamps the tool shaft axially against a stop formed by the attaching socket 1. With the conically tapered attaching socket 1 illustrated in the drawing this exclusively occurs by the contact of the tool shaft 2 on the inner side of the conically tapered socket wall 1''. Should the attaching socket 1 in contrast have a cylindrical form, it is possible to provide a stop 8 in the attaching socket 1 indicated with dot-dashed lines which abuts against the end 6 of the tool shaft 2 so that, with the clamping device closed, the tool shaft is clamped between the stop 8 on the one side and the clamping piece 3 axially on the other side as is indicated in FIG. 1.

The attaching socket 1 carries two trunnion lugs 9 projecting substantially radially from the attaching socket 1 and positioned spaced from each other. The clamping lever 5 with the clamping piece 3 is supported between these trunnion lugs 9 and, moreover, the opening 4 provided in the wall of the attaching socket 1 is provided between these trunnion lugs 9.

In the embodiment of to FIGS. 1 to 4 and 7 and 8 the clamping piece 3 is formed with a toothlike portion 3' engaged in the tool shaft 2. It projects with a cutting or knife edge 11 on the tooth front 10 facing the shaft end 6.

In the embodiment of FIG. 1 two toothlike portions axially next to each other are provided.

In one embodiment which is particularly desirable, the simple tool shaft is made from wood, since the clamping piece can be forced into the wood of the shaft particularly easily. However in this case there is a danger that with frequent changes of the hand tools on the shaft, the shaft end will show excessive wear.

Figure 6:
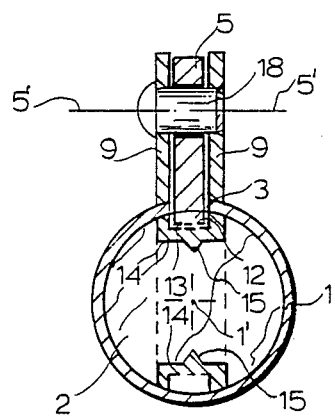
FIG. 6 is a cross sectional view taken along the section line VI—VI of FIG. 5.

This can be avoided when the clamping piece 3 corresponding to that of FIGS. 5 and 6 has a row of teeth 12 on its portion engaged in the tool shaft 2 which engages in opposing indentations 13 provided in the tool shaft 2. The teeth 12 and the opposing indentations 13 are aligned axially with each other so that again on pivoting the clamping piece axial engagement of the tool shaft 2 in the attaching socket 1 occurs by engagement of the teeth 12 in the indentations 13.

The opposing indentations 13 are provided in a shaft fitting 14 mounted rigidly on the end of the tool shaft 2 which can engage with lateral plates 15 in the tool shaft 2 so that the shaft fitting 14 is held without sliding on the end of the tool shaft 2.

The teeth and the opposing indentations themselves can be formed in many ways according to choice and thus are not shown in detail in drawing. It is possible to construct the teeth 12 from a plurality of axially adjacent protrusions and the opposing grooves 13 as holes penetrated by the protrusions in the wall of the shaft fitting 14. Also the teeth and the opposing indentations can be divided into several rows over the circumference of the tool shaft 2 so that the tool shaft can be inserted in the attaching socket 1 in several suitable pivot position about its longitudinal axis.

In the embodiment of FIGS. 5 and 6, two rows of teeth and indentations are provided about 180° opposite each other on the shaft end. However a shaft fitting 14 can be used, which not only as in FIGS. 5 and 6 is formed substantially U-shape, but is constructed like a jacket closed in the circumferential direction of the tool shaft so the teeth and the opposing indentation rows can also be distributed over the circumference of the tool shaft opposing each other in other ways, e.g. into three groups separated by a rotation of 120°.

Figure 10:
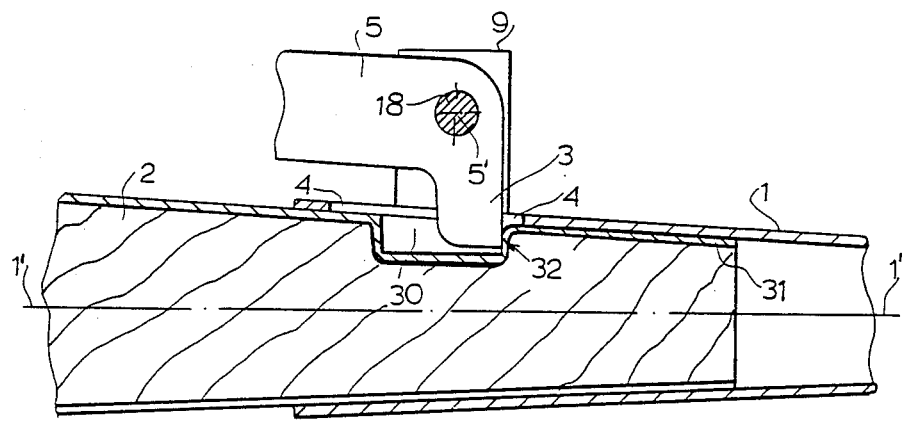
FIG. 10 is an axial cross sectional view through a further embodiment of the shaft attachment means in a form corresponding to that of FIG. 1.
Figure 11:
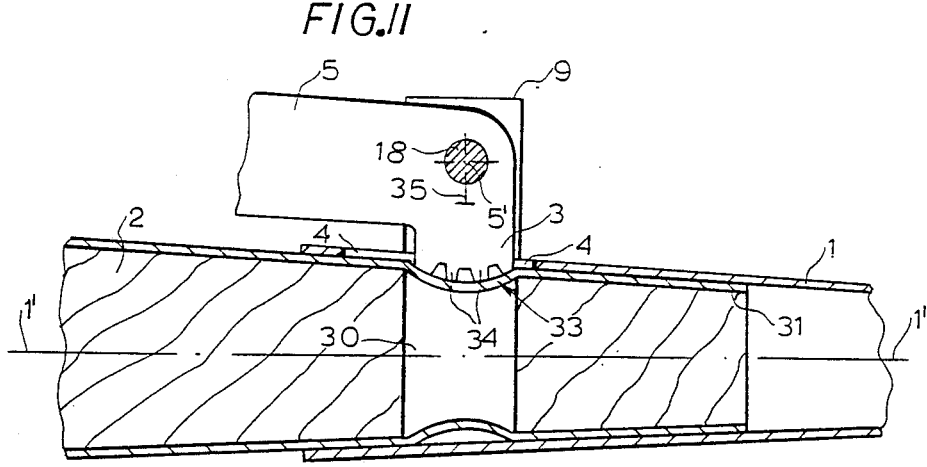
FIG. 11 is an axial cross sectional view through a still further embodiment of the shaft attachment means similar to that of FIG. 1.
Figure 12:
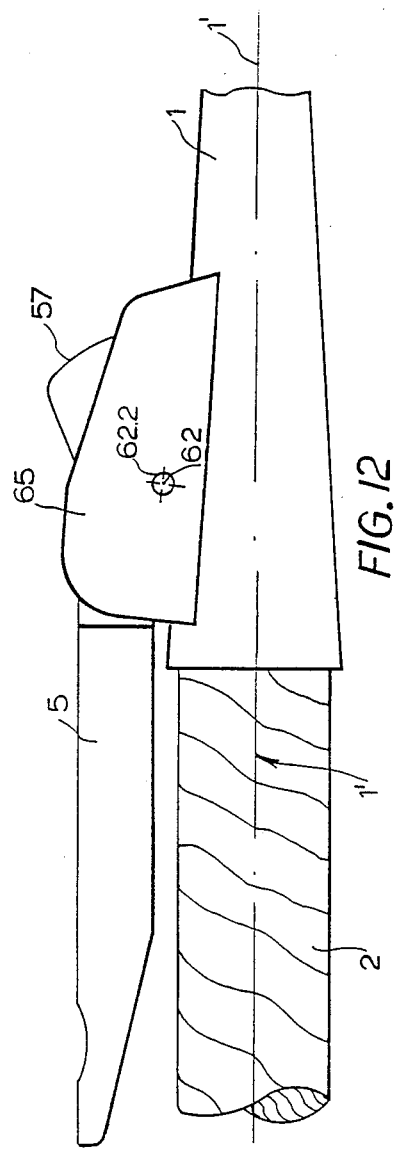
FIG. 12 is a side elevational view of another embodiment of the shaft attachment means of the hand tool according to my invention.

In the embodiments shown in FIGS. 10 and 11, a groove 30 is hollowed out in the shaft 2 for the portion of the clamping piece 3 engaged in it. On pivoting, the clamping piece 3 just fits into the groove at least in the axial direction on the front part thereof in the engaged or locked position on the tool shaft 2. This groove 30 can as shown in FIG. 10 be constructed substantially slotlike.

However also as shown in FIG. 11, the groove 30 can run like a ring around the circumference of the tool shaft 2 so that the tool shaft can be rotated to a selected angular position around its longitudinal axis on the attaching socket 1.

The groove 30 can be made in a shaft fitting 31 mounted rigidly on the end of the tool shaft which in both embodiments of FIGS. 10 and 11 comprises a sheet metal jacket embracing or surrounding the end of the tool shaft 2.

In particular as seen in FIG. 10 the groove 30 on its axial front end forms a backstop for the axial front face 32 of the clamping piece 3. By contrast in FIG. 11 the clamping piece 3 ends on its shaft side in a convex circular arc surface 33 whose center point 35 is located between the circular arc surface 33 and the pivot axis 5' of the clamping piece 3.

The groove 30 forms a concave circular arc surface corresponding to this circular arc surface over which the clamping piece 3 with its convex circular arc surface 33 slides on pivoting.

The circular arc surface 33 of the clamping piece 3 as indicated in FIG. 11 can be provided with a shape or profile 34 such as grooves, teeth or the like running parallel to the pivot axis 5' which increases the friction during the pivoting in the groove 30.

In the embodiment of FIGS. 1 to 6 the trunnion lugs 9 are attached to the attaching socket, e.g. by welding. Simpler and better, both trunnion lugs 9 form the ends of a clip 16 in the embodiment of FIGS. 7 to 9 which is held axially unslidable on the wall of the attaching socket 1.

FIG. 7 shows the clip 16 located outside on the attaching socket 1. In the circumferential direction beside the trunnion lugs 9 and at positions approximately diametrically opposed to each other, the clip is provided with radial interiorly directed pins 17, which engage in pin holes in the wall of the attaching socket 1 and hence, keep the clip 16 from sliding or rotating on the attaching socket 1. Both trunnion lugs 9 are attached with each other so as to be resistant to lug-separating tension forces, with the bolts 18 supporting the clamping piece 3 through the clamping lever 5 so that the clip cannot expand.

Embodiments according to FIGS. 8 and 9 show by contrast the clip 16 located interiorly in the attaching socket 1. The trunnion lugs 9 engage through a window forming the opening 4 for the clamping piece 3 in the wall of the attaching socket 1 to the outside. Between the window 20 and the shaft end edge 22 of the attaching socket 1, a slot 21 whose width is at least equal to the thickness of both trunnion lugs 9 runs axially so that the clip can be pushed axially through it into the attaching socket 1, when the clip 16 passing with its trunnion lugs 9 is pressed together elastically until in an opposite position.

The slot 21 is however smaller than the window 20 so that on moving from the window toward the slot the trunnion lugs 9 come into contact on the interior window edges 23 axially so that the clip 16 no longer can axially leave the attaching socket 1 and thus is secured in the attachment socket 1.

In FIGS. 1 and 3, a lock mechanism 24 is located between the tool shaft 2 and the clamping lever 5, which holds the clamping lever 5 locked in the pivot position corresponding to the closed position of the clamping device pivoted toward the tool shaft. In this embodiment the lock mechanism 24 is formed by a clip enclosing the tool shaft 2, which forms an elastic receptacle for the clamping 5 lever with its ends 27 and is held together by a rivet or rivets 26.

In the embodiment according to FIGS. 12 to 16 a locking device is provided which holds the clamping lever 5 swung toward the tool shaft 2 in the pivoted position corresponding to the closed condition of the clamping device. Thus in FIG. 12 the clamping lever 5 is illustrated in its pivoted position corresponding to the closed state of the clamping device, while in FIG. 13 it is illustrated in its pivoted position corresponding to the open condition or state.

In particular both trunnion lugs 9 are part of a supporting member 50, which—as seen in the axial direction in the attaching socket 1—has substantially the shape of a U-shape strap whose strap legs 52 connected by a strap back 51 extend axially to the trunnion lugs 9.

The supporting member 50 is mounted in the attaching socket 1 with both trunnion lugs 9 from the outside so that both trunnion lugs 9 with upwardly directed claws 53 engage under flanges 54 provided under both sides of the opening 4 for the clamping piece 3, which are formed in a wall of the attaching socket 1.

The supporting member 50 is secured from axial motion in the attaching socket 1 in that the strap legs 52 overlap side bars 55 formed on the attaching socket 1 and are secured with them with a pin or peg 56.

The locking device has a locking member 57 movable in relation to the clamping lever 5, which engages with a lock bolt 59 in a recess 60 provided in the clamping lever 5, if the clamping lever is located in the pivoted position (FIG. 12) corresponding to the closed condition of the clamping device.

Figure 13:
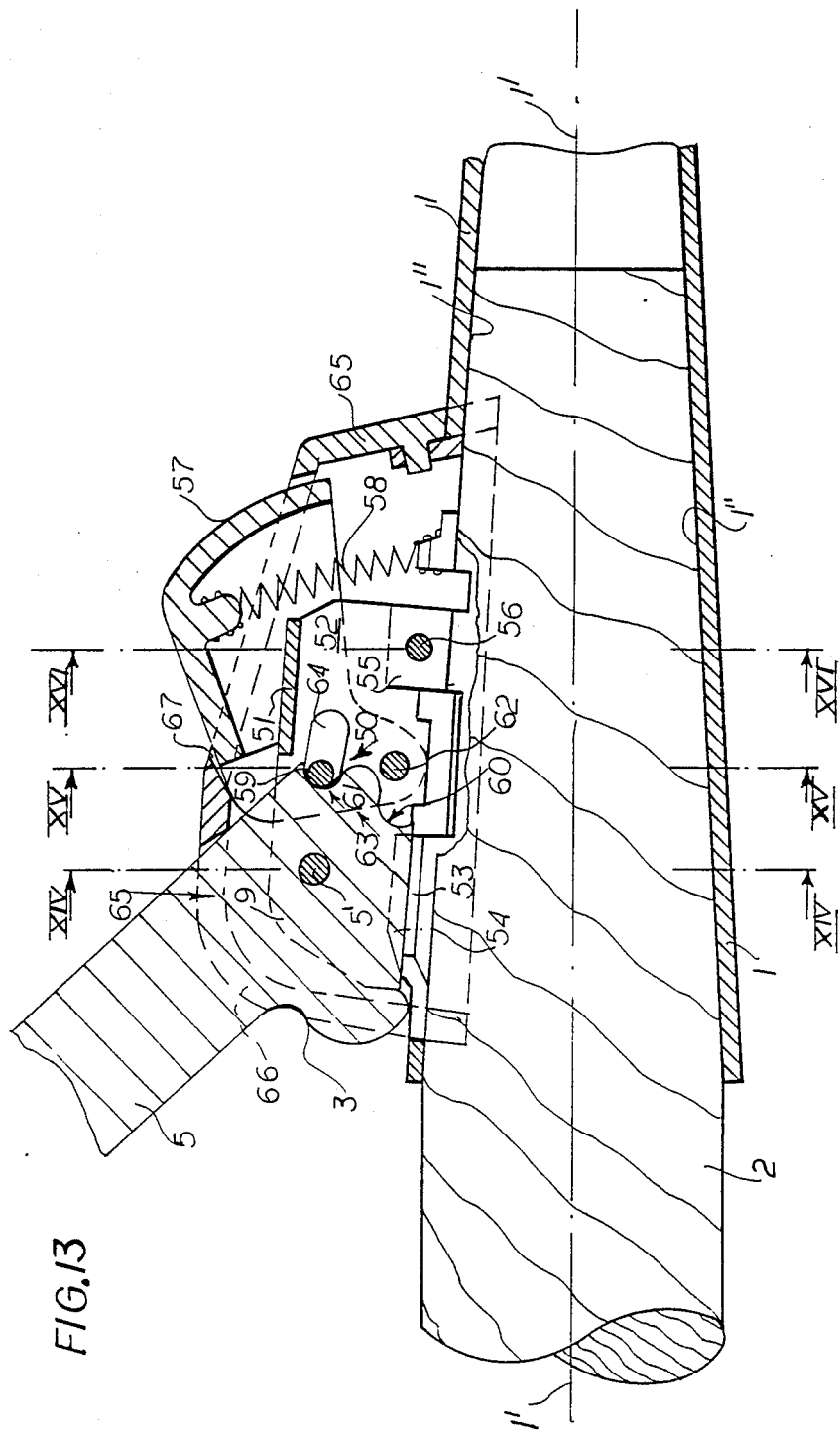
FIG. 13 is a longitudinal cross sectional view through the attachment assembly of FIG. 12.
Figure 16:
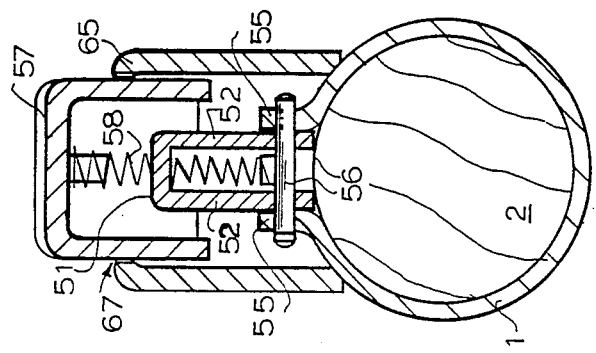
FIG. 16 is a transverse cross sectional view taken along the section line XVl—XVI of FIG. 13.

Moreover a receptacle 61 is provided on the clamping lever 5 beside the recess 60 for the lock bolt 59., in which the lock bolt engages under the force of the lock spring 58, when the clamping lever 5, as is illustrated in FIG. 13, is located in the pivoted position corresponding to the open condition of the clamping device.

The recess 60 and the receptacle 61 are formed in regard to their side edges so that with the lock bolt 59 engaged in the recess 60, the clamping lever 5 can only be moved into its pivoted position corresponding to the open condition of the clamping device, when previously the locking member 57 is moved out from the recess 60 against the force of the lock spring 58.

The receptacle 61 is, by contrast, formed so that the clamping lever 5 can be moved from its pivoted position corresponding to the open condition of the clamping device into its pivoted position corresponding to the closed or locked configuration without previously releasing the locking member 57 from engagement in the receptacle 61.

On moving the clamping lever 5 into the closed or locked position, the lock bolt 59 is forced out from locking engagement by the sides of the receptacle 61.

In detail the locking member 57 is supported so as to pivot about an axis 62 parallel to the pivot axis 5' of the clamping lever 5 and is pivoted with its lock bolt 59 out from the recess 60 by hand against the force of the locking spring 58. The locking member 57 is mounted on its axis 62 on the supporting member 50 forming the trunnion lugs 9.

In particular the locking member 57 has two lateral plates 63 overlapping both sides of the clamping lever 5 on both sides of the recess 60 and the receptacle 61, with which the locking member 57 is supported on its pivot axis 62 and between which a transverse pin forming the lock bolt 59 extends, which is put through the supporting member 50 in an elongated hole 64.

Figure 15:
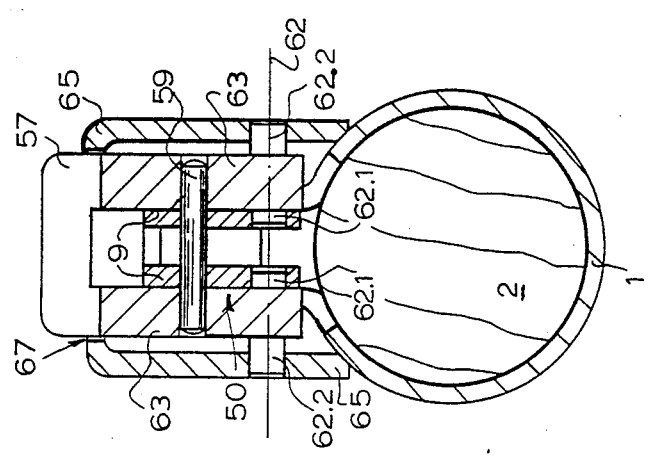
FIG. 15 is a transverse cross sectional view taken along the section line, XV—XV of FIG. 13.
Figure 14:
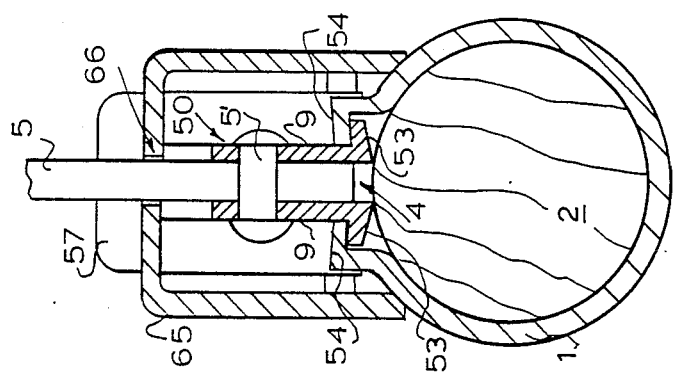
FIG. 14 is a transverse cross sectional view taken along the section line XIV—XIV of FIG. 13.

As can be seen in FIG. 15 the lateral plates 63 have pins mounted coaxially on both sides on the axis 62. The inner pins 62.1 support the locking member 57 in the supporting member 50. The outer pins 62.2 act to keep a cap 65 on the attaching socket 1, which covers the trunnion lugs 9 and the supporting member 50 forming them. The cap 65 rests on the attaching socket 1 and is provided with windows 66, 67 for the clamping lever 5 and/or the locking member 57.

The attaching socket 1 is in all cases part of a tool implement which has not been completely shown. This tool implement is generally conventional although it can be novel as well and its structure should not limit in any way the scope of my invention which relates to the way the tool implement is attached to the tool shaft. The tool implement can have a blade, surface cleaner, a pick, a hook, a rake or any of a variety of useful forms as well as the attaching socket.

Furthermore my invention is not intended to be limited to the details provided in the above specific description and it will be understood that various omissions, modifications, substitutions and changes in these details can be made without departing in any way from the spirit of my invention.

I claim:

1. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, a groove being hollowed out of said tool shaft for the portion of said clamping piece engageable in said tool shaft, said groove running like a ring around the circumference of said tool shaft.

2. The improvement defined in claim 1 wherein said clamping piece is provided with a pointed toothlike portion engageable in said tool shaft and has a knife like tooth front directed toward said front end of said tool shaft.

3. The improvement defined in claim 1 wherein in a cylindrical attaching socket said stop abuts against said front end of said tool shaft.

4. The improvement defined in claim 1 wherein with a conically tapered one of said attaching sockets said stop is provided by a conically tapered one of said walls of said attaching socket which comes in contact with said tool shaft.

5. The improvement defined in claim 1 wherein both of said trunnion lugs are formed on a supporting member which is held axially unslidable on said wall of said attaching socket.

6. The improvement defined in claim 5 wherein said supporting member is formed as a clip whose ends form both of said trunnion lugs.

7. The improvement defined in claim 1 wherein a lock mechanism is positioned between said tool shaft and said clamping lever, which keeps said clamping lever in a pivoted position corresponding to said closed condition of said clamping device swung in toward said tool shaft.

8. The improvement defined in claim 1 wherein a locking device holding said clamping lever in a pivoted position corresponding to said closed condition of said clamping device swung in toward said tool shaft is provided.

9. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, said groove being formed in a shaft fitting mounted rigidly on said front end of said tool shaft.

10. The improvement defined in claim 9 said shaft fitting comprises a jacket enclosing said front end of said tool shaft.

11. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, a groove being hollowed out of said tool shaft for the portion of said clamping piece engageable in said tool shaft, said groove providing a stop for the axially front side of said clamping piece.

12. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, a groove being hollowed out of said tool shaft for the portion of said clamping piece engageable in said tool shaft, said clamping piece ending in a convex circular arc surface whose center point is located between said circular arc surface and said pivot axis of said clamping piece and said groove forms a concave circular arc surface corresponding to said convex circular arc surface, from which said clamping piece with said convex circular arc surface is slid away on pivoting.

13. The improvement defined in claim 12 wherein said convex circular arc surface of said clamping piece is provided with a shape including grooves, teeth and similar protrusions extending substantially parallel to said pivot axis of said clamping piece which increases the friction in said groove on pivoting.

14. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, said clamping piece having a plurality of teeth on a portion of said clamping piece engaged in said tool shaft, which engages in a plurality of opposing indentations provided in said tool shaft, said teeth and said opposing indentations being axially aligned.

15. The improvement defined in claim 14 wherein said opposing indentations are provided in a shaft fitting mounted rigidly on said front end of said tool shaft.

16. The improvement defined in claim 15 wherein said teeth are formed by at least one stud and each of said opposing indentations is formed as a hole penetrated by said stud in said shaft fitting.

17. The improvement defined in claim 16 wherein said studs and said indentations are positioned in several groups on said clamping piece and/or on said shaft fitting side-by-side in the axial direction of said tool shaft.

18. The improvement defined in claim 17 wherein said teeth and said opposing indentations are distributed in several rows around the circumference of said tool shaft.

19. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, both of said trunnion lugs being formed on a supporting member which is held axially unslidable on said wall of said attaching socket, said supporting member being formed as a clip whose ends form both of said trunnion lugs, said clip being located exteriorly on said attaching socket and having a plurality of pins directed interiorly radially at positions approximately opposite on said clip and adjacent said trunnion lugs, which engage in pin holes in said wall of said attaching socket, and both of said trunnion lugs are attached tension-proof with each other with a bolt supporting said clamping piece.

20. In a hand tool comprising a tool shaft received in an attaching socket of a working implement and a clamping device mounted exteriorly on said attchng socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, both of said trunnion lugs being formed on a supporting member which is held axially unslidable on said wall of said attaching socket, said supporting member being formed as a clip whose ends form both of said trunnion lugs, said clip being located inside of said attaching socket and said trunnion lugs engage outside through a window forming said opening for said clamping piece in said wall of said attaching socket, a slot extending axially in said wall between said window and an edge of said attaching socket whose width is at least equal to the thickness of both of said trunnion lugs together and smaller than said window.

21. In a hand tool comprising a tool shaft received in an attaching socket of a working implement and a clamping device mounted exteriorly on said attchng socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, both of said trunnion lugs being formed on a supporting member which is held axially unslidable on said wall of said attaching socket, both of said trunnion lugs extending into said attaching socket exteriorly from said supporting member and provided with at least two outwardly directed claws extending under both sides of said opening for said clamping piece and being engaged by a plurality of flanges formed on said wall of said attaching socket, said supporting member being secured against axial sliding in said attaching socket.

22. In a hand tool comprising a tool shaft received in an attaching socket of a working implement and a clamping device mounted exteriorly on said attaching socket with a clamping piece which engages said tool shaft through an opening in a wall of said attaching socket with said clamping device in a closed condition, the improvement wherein said clamping piece is mounted on a clamping lever which is pivotally mounted exteriorly on said attaching socket pivotable about one pivot axis extending substantially perpendicularly to the longitudinal axis of said socket, said clamping lever being substantially longer than said clamping piece from said pivot axis, said clamping piece together with said clamping lever forming a bent lever, said clamping lever being swung inwardly in said closed condition of said clamping device against said tool shaft and being swung away in the open condition of said clamping device sufficiently far from said tool shaft that said clamping piece is out of engagement with said tool shaft and on closing said clamping device the front end of said tool shaft is braced by said clamping piece axially against a stop formed by said attaching socket, said attaching socket having two trunnion lugs projecting substantially radially from said attaching socket spaced parallel from each other, between which said clamping lever is mounted with said clamping piece and said opening, said opening being provided in said wall of said attaching socket, in which said clamping piece in pivoting comes into contact to fit at least at said front end of said tool shaft in the axial direction, and a locking device holding said clamping lever in a pivoted position corresponding to said closed condition of said clamping device swung in toward said tool shaft being provided, said locking device having a locking member movable relative to said clamping lever, which engages with a lock bolt in a recess provided in said clamping lever under the force of a lock spring when said clamping lever is located in said pivoted position corresponding to said closed condition.

23. The improvement defined in claim 22 wherein a receptacle is provided for said locking member in said clamping lever adjacent said recess, in which said lock bolt of said locking member engages under said force of said lock spring, if said clamping lever is located in said pivoted position corresponding to said open condition of said clamping device.

24. The improvement defined in claim 23 wherein said locking member is mounted pivotable about another pivot axis substantially parallel to said one pivot axis of said clamping lever and is pivotable against said force of said lock spring with said lock bolt from said recess.

25. The improvement defined in claim 24 wherein said locking member is supported on said trunnion lugs and said supporting member forming said trunnion lugs.

26. The improvement defined in claim 25 wherein said locking member has two lateral plates overlapping said clamping member on both sides of said recess and said receptacle, with which said locking member is mounted pivotable about said other pivot axis and between which a transverse pin forming said lock bolt extends.

27. The improvement defined in claim 26 wherein a cap sitting on said attaching socket covering said trunnion lugs and said supporting member forming them is provided, which has a window for said clamping lever and said locking member to protrude through.

* * * * *